United States Patent [19]

Yeo

[11] Patent Number: 4,511,075
[45] Date of Patent: Apr. 16, 1985

[54] WELDING NUCLEAR REACTOR FUEL ROD END PLUGS

[75] Inventor: Denis Yeo, Columbia, S.C.
[73] Assignee: Westinghouse Electric Corp., Pittsburgh, Pa.
[21] Appl. No.: 471,114
[22] Filed: Mar. 1, 1983
[51] Int. Cl.³ .............................................. B23K 9/00
[52] U.S. Cl. ......................................... 228/7; 228/10; 228/48; 228/47; 228/221
[58] Field of Search ................... 228/7, 10, 18, 47, 48, 228/221

[56] References Cited

FOREIGN PATENT DOCUMENTS 193295 11/1982 Japan ................................... 228/221

Primary Examiner—Kenneth J. Ramsey
Assistant Examiner—Kurt Rowan
Attorney, Agent, or Firm—D. E. Erickson

[57] ABSTRACT

Apparatus for applying a vacuum to a nuclear fuel rod cladding tube's interior through its open end while girth welding an inserted end plug to its other end. An airtight housing has an orifice with a seal which can hermetically engage the tube's open end. A vacuum hose has one end connected to the housing and the other end connected to a vacuum pump. A mechanized device moves the housing to engage or disengage its seal with the tube's open end. Preferably the mechanized device includes an arm having one end attached to the housing and the other end pivotally attached to a movable table; an arm rotating device to coaxially align the housing's orifice with the welding-positioned tube; and a table moving device to engage the seal of the coaxially aligned orifice with the tube's open end.

15 Claims, 3 Drawing Figures

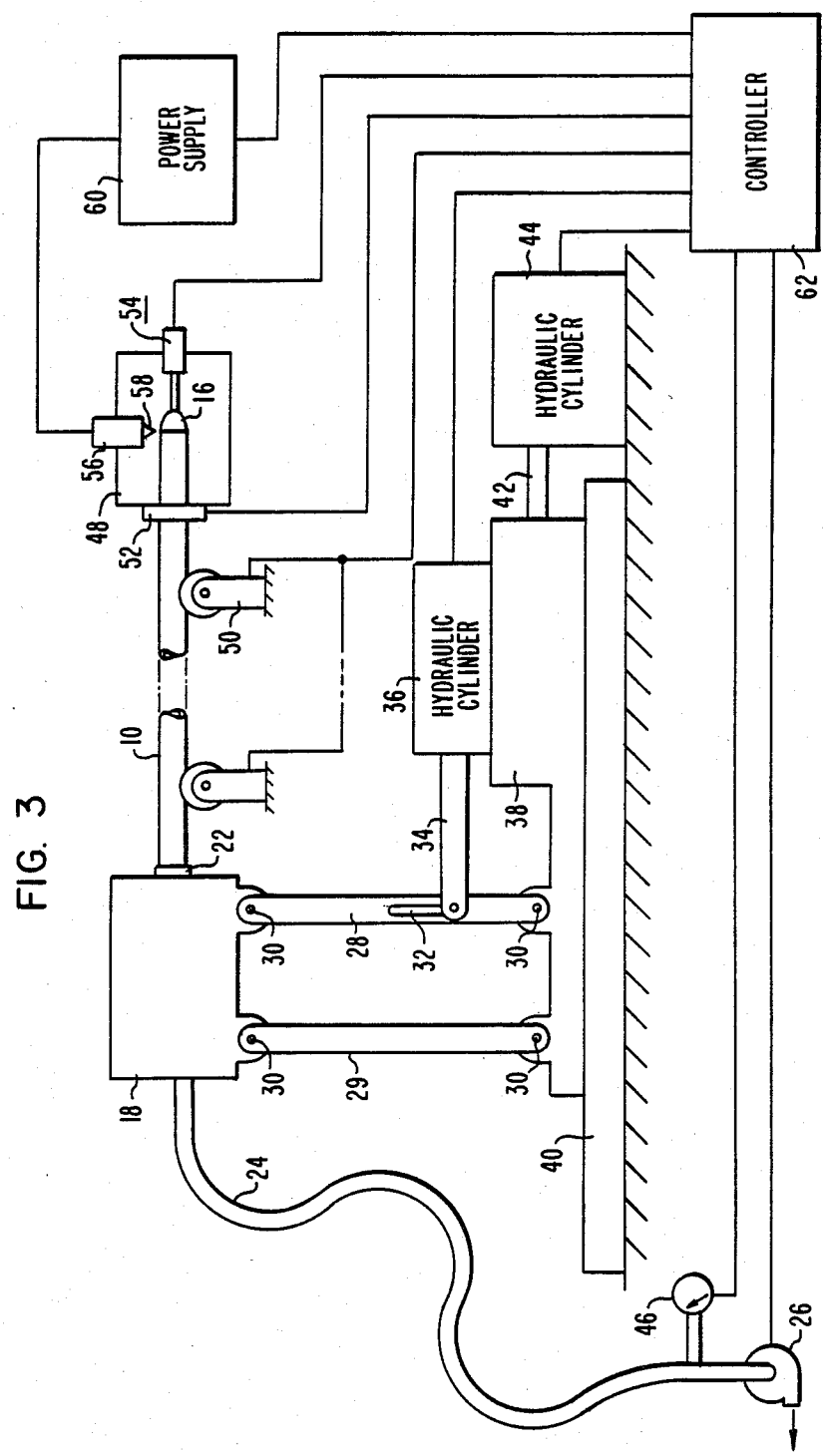

WELDING NUCLEAR REACTOR FUEL ROD END PLUGS

BACKGROUND OF THE INVENTION

The present invention relates generally to welding an end plug on a nuclear reactor fuel rod cladding tube, and more particularly, to an apparatus for drawing a vacuum on the interior of a nuclear fuel rod cladding tube when the tube is in position for such welding and also to a system for such welding which incorporates the vacuum apparatus.

The core of a nuclear reactor is composed of a multiplicity of fuel assemblies with each fuel assembly comprised of a plurality of fuel rods. The steps included in the conventional manufacture of a typical nuclear reactor fuel rod started with the loading of nuclear fuel pellets in a cladding tube. Then a bottom end plug was inserted in the bottom of the cladding tube, and a top end plug was inserted in the top of the cladding tube. The top end plug contained an axial bore. The top of the cladding tube with the inserted top end plug was placed in a welding chamber. The axial bore abutted a hole in the rotating stop of the welding chamber. To prevent the atmosphere within the interior of the fuel rod from contaminating the environment of the welding chamber during welding, a vacuum was drawn through the hole in the rotating stop of the welding chamber. This was done by having one end of a vacuum hose attached to a vacuum pump and the other end attached to the hole in the rotating stop. The cladding tube was rotated as the girth weld of the top end plug was made. Then the cladding tube was moved to a separate station for girth welding the bottom end plug. This was done without applying a vacuum to the interior of the cladding tube because the bottom end plug had no axial bore to transmit the atmosphere within the cladding tube to the welding chamber. Then the cladding tube was transported to another station for pressurization of the interior of the fuel rod with helium through the axial bore of the top end plug, and for the closing of the axial bore with a seal weld. The above steps included the use of machines to help perform the various operations.

A common defect that occurred during girth welding was undercutting of the inside diameter of the cladding tube. It was noted that a side benefit of drawing the vacuum on the inside of the fuel rod during girth welding of the top end plug was the minimization of that defect. Therefore, what is needed is a device which will automatically apply a vacuum to the cladding tube during girth welding of the bottom end plug to minimize undercutting of the inside diameter of the cladding tube for this end plug also.

SUMMARY OF THE INVENTION

Briefly stated, the invention is directed towards apparatus for applying a vacuum to a nuclear fuel rod cladding tube's interior througn its open end while girth welding an inserted end plug to its other end. An airtight housing has an orifice with a seal which can hermetically engage the tube's open end. A vacuum hose has one end connected to the housing and the other end connected to a vacuum pump. A first device is supplied for measuring the vacuum within the tube. A second device moves the housing to engage or disengage its seal with the tube's open end. A third device moves the tube to and from the welding position. A fourth device senses when the tube is in the welding position. A fifth device longitudinally rotates the tube. A welding machine has a power supply and a welding tip. The welding tip is located near the inserted end plug's common boundary with the tube. The operation of the apparatus is supervised by a mechanism which, in a predetermined manner, monitors the vacuum measuring device and the tube sensing device, and controls the housing moving device, the vacuum pump, the tube moving device, the tube rotating device, and the welding power supply.

The invention is also directed towards apparatus for applying a vacuum to a nuclear fuel rod cladding tube's interior through its open end when the tube is in position for welding an inserted end plug to its other end. A movable table is placed on a fixed base. A first arrangement pivotally attaches one end of an arm to the table. An airtight housing has an orifice with a seal which can hermetically engage the tube's open end. The housing is attached to the other end of the arm and can be positioned to coaxially align the orifice with the tube by rotation of the arm about the pivotal attachment arrangement. A second arrangement rotates the arm about the pivotal attachment arrangement to bring the orifice into coaxial alignment with the tube and to take the orifice out of alignment. A third arrangement, for the coaxially aligned orifice, moves the table along a line to engage or disengage the seal with the tube's open end. A vacuum hose has one end connected to the housing and the other end connected to a vacuum pump. The operation of the apparatus is governed by a controller which, in a predetermined manner, controls the arm rotating arrangement, the table moving arrangement, and the vacuum pump.

BRIEF DESCRIPTION OF THE DRAWINGS

The subject matter of the invention is particularly pointed out and distinctly claimed in the concluding portion of this specification. The invention, however, both as to organization and method operation, together with further advantages thereof, may best be understood by reference to the following description taken in connection with the accompanying drawings in which:

FIG. 3 is the view of FIG. 2 with the coaxially aligned orifice's seal hermetically engaged with the welding-positioned cladding tube.

DETAILED DESCRIPTION OF THE INVENTION

Figure 1:
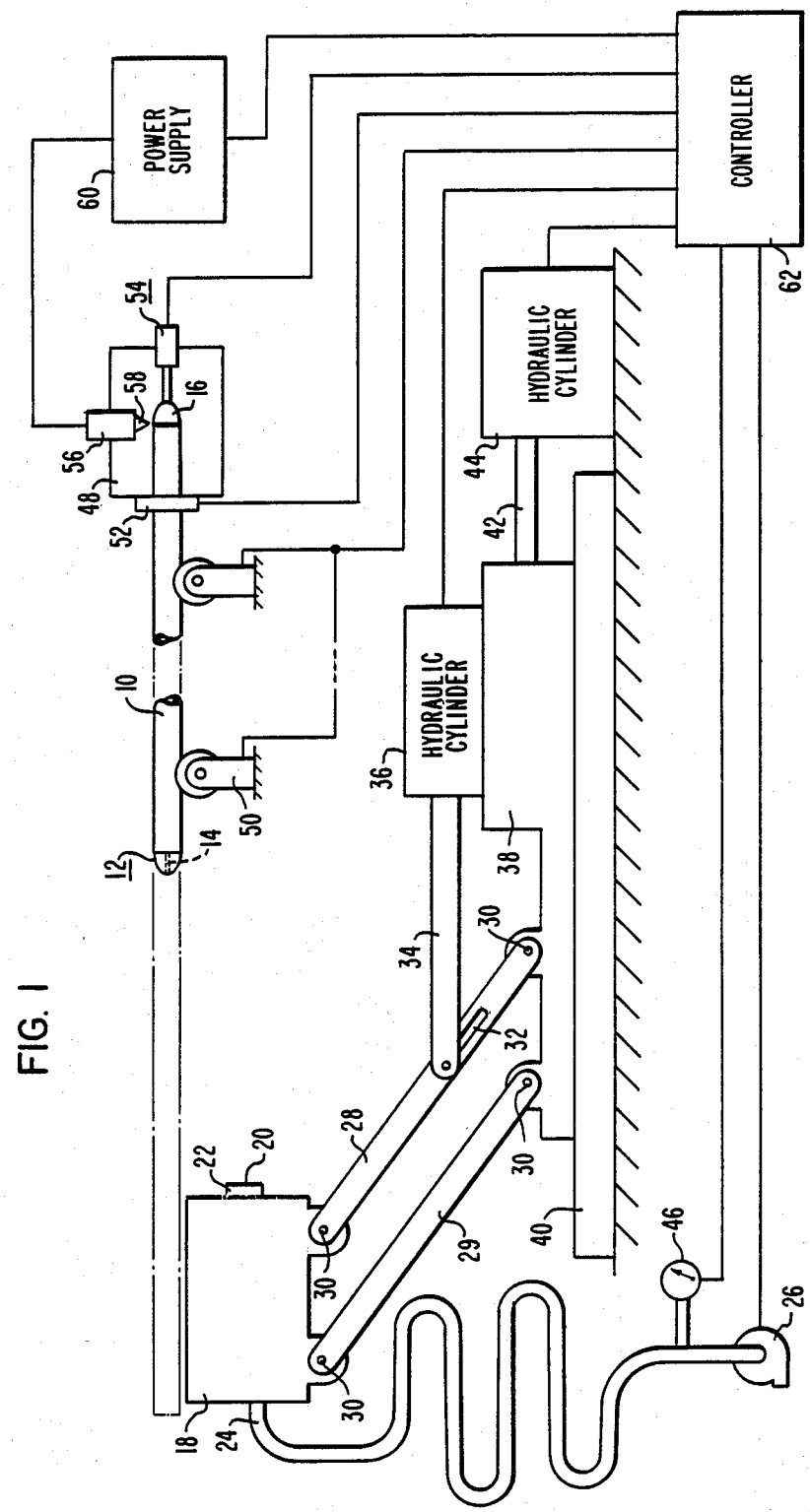
FIG. 1 is an elevational schematic view of an embodiment of the invention with the housing moved out of the way to allow the cladding tube to enter the welding chamber.

Referring now to the drawings wherein like reference characters designate like or corresponding parts throughout the several views, there is shown in the Figures a nuclear reactor fuel rod cladding tube 10. A bottom end plug 16 has been inserted into the bottom end of the tube 10. The top end of the tube is open since it contains an inserted (or even girth welded) top end plug 12 with an axial bore 14. In this example the tube 10 would contain fuel pellets. However, the invention is equally applicable to a tube containing only an inserted bottom end plug. Therefore it is to be understood that a tube 10 has an open end if its top end does not contain a top end plug or if its top end contains a top end plug 12 with an axial bore 14.

Means are provided for transporting the tube 10, with the inserted bottom end plug 16, to and from the welding position within a welding chamber 48. Preferably such tube transporting means includes a set of driven rollers 50 for longitudinal movement of the tube 10. Other such means includes a movable tray or conveyor belt, or the like.

Means are also provided for sensing when the tube 10 is in the welding position. Preferably such means includes a continuity switch 54. Another preferable means includes an orifice in the welding chamber wall which would be hermetically blocked by the bottom end plug of a welding-positioned tube. Vacuum apparatus (vacuum pump, vacuum gage and vacuum hose) attached to the orifice would indicate a vacuum when the tube is in position for girth welding the bottom end plug. Other such means includes other conventional position indication switches and the like.

Means are included for rotating the welding-positioned tube 10 about its longitudinal axis. Preferably such tube rotating means includes a powerized rotatable chuck 52. Other means include a tensioned belt driven by a motor and the like.

The welding chamber 48 has a welding tip 58 which is part of a welding machine 56. The welding machine 56 also has an associated power supply 60. Typically, the welding is done by the TIG (tungsten inert gas) method. The welding tip 58 is positioned for girth welding the inserted bottom end plug 16 to the tube 10 when the tube is in position for welding as indicated by the tube sensing means. The welding tip 58 therefore would be placed proximate the location of the generally circular shaped exposed common boundary of the inserted bottom end plug 16 and the welding-positioned tube 10.

The apparatus for applying a vacuum to the interior of the nuclear fuel rod cladding tube 10 can be used with tube feeding and welding mechanisms other than as described in the preceding paragraphs. The vacuum applying apparatus applies the vacuum through an open end of the tube when the tube is in position for welding an inserted end plug to the other end of the tube. The vacuum applying apparatus of the invention has an airtight housing 18, a vacuum hose 24, a vacuum pump 26, a housing positioning means, and a controller means.

The airtight housing 18 has a generally circular orifice 20 with a seal 22 which is hermetically engageable with the open end of the tube 10. The seal 22 must permit rotation of the tube 10 about its longitudinal axis and would include an "O" ring member for that purpose.

The vacuum hose 24 has one end connected to the housing 18 and the other end connected to the vacuum pump 26.

The mechanized housing positioning means disposes the housing 18 between a first position which hermetically engages the orifice's seal 22 with the open end of the welding-positioned tube 10 and a second position which disengages the seal 22 from the tube 10. Preferably such housing positioning or disposing means includes a fixed base 40, a movable table 38, an arm 28, an arm pivotal attaching means, an arm rotating means, and a table moving means. The movable table 38 is placed on the fixed base 40.

The arm pivotal attaching means pivotally attaches an end of the arm 28 to the table 38. Preferably such means includes a hinge or hinged attachment 38. The other end of the arm 28 is attached to the housing 18 and the housing 18 is positionable to coaxially align the orifice 20 with the welding-positioned tube 10 by rotating the arm 28 with respect to the table 38 about the arm pivotal attaching means (e.g. the hinged attachment 30). With only one arm, a rigid attachment of it to the housing would enable the coaxial alignment of the orifice 20 and the tube 10. Preferably three links 29 (in addition to the arm 28) are used with each of the links 29 and arm 28 hingeably attached at one end to the table 38 and hingeably attached at the other end to the housing 18, and with the hinged attachments 30 disposed to form the vertices of a general parallelepiped. With this preferred arrangement, the housing 18 will remain generally parallel with the table 38 as the links 29 and the arm 28 rotate about the hinged attachments 30.

The arm rotating means rotates the arm 28 with respect to the table 38 about the arm's pivotal attaching means (e.g. the associated hinged attachment 30). The rotation is between a first position disposing the housing 18 to coaxially align the orifice 20 with the welding-positioned tube 10, and a second position disposing the housing 18 to avoid intersection with the welding-positioned tube 10 longitudinally extended. The second position avoids a collision of the housing 18 and the tube 10 when the tube 10 exits the chamber 48 after welding. Preferably, the arm 28 includes a longitudinal slot 32, and the arm rotating means includes a powered (e.g. pneumatic, hydraulic, etc.) cylinder fixed to the table 38, such as a hydraulic cylinder 36 whose piston 34 has its free end movably attached in the slot 32 to the arm 28. Other arm rotating means include a motor fixed to the table and having a shaft which is connected to and rotates the hinged attachment, and the like.

The table moving means moves the table 38 back and forth on the base 40 along a line coplanar with, and parallel to, the welding-positioned tube 10. The table 38 is moved between a first location hermetically engaging the seal 22 of the coaxially aligned orifice 20 with the open end of the welding-positioned tube and a second location disengaging the seal 22 of the coaxially aligned orifice 20 from the open end of the welding-positioned tube 10. Preferably the table moving means includes a stationary powered cylinder, such as a hydraulic cylinder 44 whose piston 42 has its free end attached to the table 38.

The vacuum applying apparatus has a controller means for controlling the arm rotating means, the table moving means, and the vacuum pump 26, all in a predetermined manner. For example, when a tube 10 is in position for welding, the controller means commands the arm rotating means to coaxially align the orificie 20 with the tube 10 (i.e. the first position) then commands the table moving means to hermetically engage the seal 22 of the coaxially-aligned orifice 20 with the open end of the table 10 (i.e. the first location), and then activates the vacuum pump. When the welding is complete, the controller means deactivates the vacuum pump, then commands the table moving means to disengage the seal 22 from the tube 10 (i.e. the second location), and then commands the arm rotating means to return to its starting (i.e. second) position. Preferably such controller means includes a microprocessor with associated peripheral equipment, known to those skilled in the art, to tie in the microprocessor with the vacuum pump and the hydraulic cylinders. Other such controller means include position indicating switches, relays, and the like, known to those skilled in the art.

Preferably the vacuum applying apparatus also includes means for measuring the vacuum within the interior of the welding-positioned tube 10 when the seal 22 of the coaxially aligned orifice 20 is hermetically engaged with the welding-positioned tube 10. The vacuum measuring means preferably includes a vacuum gage 46 connected to the vacuum hose 24 between the housing 18 and the vacuum pump 26.

Figure 2:
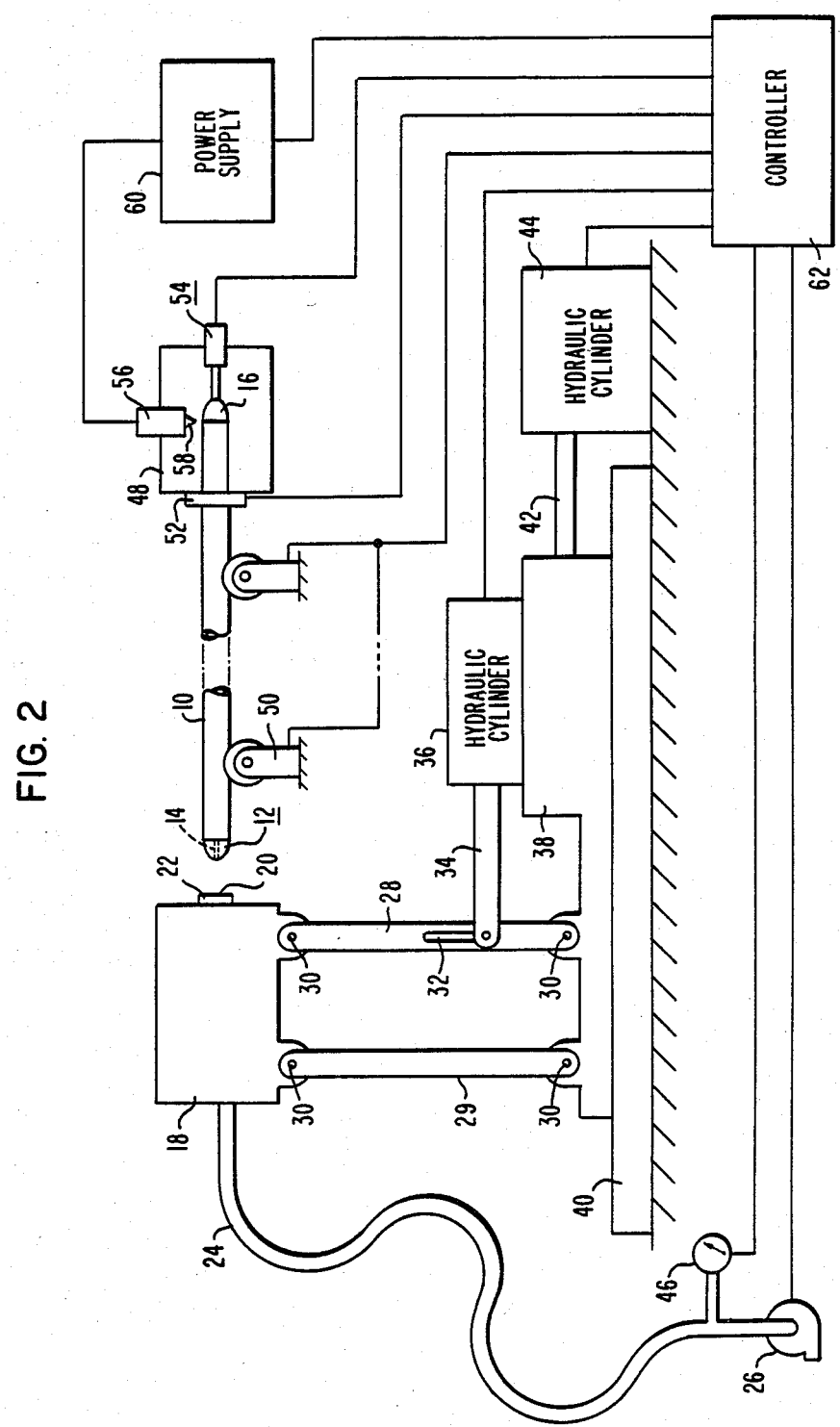
FIG. 2 is the view of FIG. 1 with the housing's orifice coaxially aligned with the welding-positioned cladding tube.

Also, preferably the vacuum applying apparatus includes the end plug girth welding apparatus previously discussed, and the controller means monitors the vacuum measuring means and the tube's sensing means, and controls the tube transporting means, the rod rotating means, and the welding power supply, all in a predetermined manner. For example, with additional equipment similar to that discussed for the more limiting controlling means found in the second preceding paragraph, the expanded controller means could control the vacuum and welding operations in the following manner. The controller means (controller 62) activates the tube transporting means (rollers 50) to transport an unwelded tube to the welding position (see FIG. 1); then the controller means (controller 62) activates the arm rotating means (hydraulic cylinder 36) to rotate the housing 18 to the first position (see FIG. 2) and then activates the table moving means (hydraulic cylinder 44) to move the table 38 to the first location (see FIG. 3), activates the tube rotating means (chuck 52) to longitudinally rotate the tube 10, and activates the vacuum pump 26 to draw a vacuum, all when the tube welding position sensing means (switch 54) indicates the tube is in the welding position; and then the controller means (controller 62) activates the welding power supply 60 when the vacuum sensing means (gauge 46) indicates a precalculated vacuum level. Likewise, the controller means (controller 62) deactivates the welding power supply 60, deactivates the tube rotating device (chuck 52), deactivates the vacuum pump 26, activates the table moving means (hydraulic cylinder 44) to move the table to the second location (see FIG. 2), and then activates the arm rotating means (hydraulic cylinder 36) to rotate the housing 18 to the second position (see FIG. 1), all when the inserted end plug 16 has been girth welded to the welding-positioned tube 10; and then the controlling means (controller 62) activates the tube transporting means (rollers 50) to transport the welded tube away from the welding position when the housing is at the second position. The completion of welding can be signaled by, for example, a complete revolution of the rod rotating means after the welding power supply has been activated.

It will be apparent that many modifications and variations are possible in light of the above teachings. It, therefore, is to be understood that within the scope of the appended claims, the invention may be practiced other than as specifically described.

I claim:

1. Apparatus for applying a vacuum to the interior of a nuclear fuel rod cladding tube through an open end of said tube while girth welding an inserted end plug to the other end of said tube, all when said tube is in position for said welding and wherein said inserted end plug and said tube have an exposed common boundary of generally circular shape, said apparatus comprising:
   (a) an airtight housing, said housing having a generally circular orifice with a seal hermetically engageable with said open end of said tube;
   (b) a vacuum hose having one end connected to said housing;
   (c) a vacuum pump connected to the other end of said hose;
   (d) means for measuring the vacuum within the interior of said welding-positioned tube when said seal of said coaxially aligned orifice is hermetically engaged with said welding-positioned tube;
   (e) mechanized means for disposing said housing between a first site hermetically engaging said seal of said orifice with said open end of said welding-positioned tube and a second site disengaging said seal of said orifice from said open end of said welding-positioned tube;
   (f) means for transporting said tube, with said inserted end plug, to and from said welding position;
   (g) means for sensing when said tube is in said welding position;
   (h) means for rotating said welding-positioned tube about its longitudinal axis;
   (i) a welding machine having a welding tip disposed proximate said exposed common boundary of said inserted end plug and said welding-positioned tube, and said welding machine also having a power supply; and
   (j) means for monitoring said vacuum measuring means and said tube sensing means and for controlling said housing disposing means, said vacuum pump, said tube transporting means, said tube rotating means, and said welding power supply, all in a predetermined manner.

2. Apparatus for applying a vacuum to the interior of a nuclear fuel rod cladding tube through an open end of said tube when said tube is in position for welding an inserted end plug to the other end of said tube, said apparatus comprising:
   (a) a fixed base;
   (b) a table movably disposed on said base;
   (c) an arm;
   (d) means for pivotally attaching one end of said arm to said table;
   (e) an airtight housing, said housing having a generally circular orifice with a seal hermetically engageable with said open end of said tube, said housing attached to the other end of said arm, and said housing disposable, by rotation of said arm about said pivotal attaching means, to coaxially align said orifice with said welding-positioned tube;
   (f) means for rotating said arm with respect to said table about said pivot means between a first position disposing said housing to coaxially align said orifice with said welding-positioned tube and a second position disposing said housing to avoid intersection of said housing with said welding-positioned tube longitudinally extended;
   (g) means for moving said table back and forth on said base along a line coplanar with, and parallel to said welding-positioned tube between a first location hermetically engaging said seal of said coaxially aligned orifice with said open end of said welding-positioned tube and a second location disengaging said seal of said coaxially aligned orifice from said open end of said welding-positioned tube;
   (h) a vacuum hose having one end connected to said housing;
   (i) a vacuum pump connected to the other end of said hose; and (j) means for controlling said arm rotating means, said table moving means, and said vacuum pump, all in a predetermined manner.

3. The apparatus of claim 2, wherein said arm includes a longitudinal slot and wherein said arm rotating means includes a powered cylinder fixed to said table, said cylinder having a piston with its free end movably attached in said slot to said arm.

4. The apparatus of claim 2, wherein said table moving means includes a stationary powered cylinder having a piston with its free end attached to said table.

5. The apparatus of claim 2, also including:
   (k) means for measuring the vacuum within the interior of said welding-positioned tube when said seal of said coaxially aligned orifice is hermetically engaged with said welding-positioned tube.

6. The apparatus of claim 3, wherein said vacuum measuring means includes a vacuum gauge connected to said vacuum hose between said housing and said vacuum pump.

7. The apparatus of claim 2, wherein said pivotal attaching means includes a hinge.

8. The apparatus of claim 2, wherein said housing is attached by a hinge to the other end of said arm and also including three links, each link having one end attached by a hinge to said table and the other end attached by a hinge to said housing, said hinges of the ends of said arm and said links generally disposed as the vertices of a general parallelepiped.

9. The apparatus of claim 3, also for girth welding said inserted end plug to the other end of said tube, wherein said inserted end plug and said tube have an exposed common boundary of generaly circular shape, and also including:
   (l) means for transporting said tube, with said inserted end plug, to and from said welding position;
   (m) means for sensing when said tube is in said welding position;
   (n) means for rotating said welding-positioned tube about its longitudinal axis; and
   (o) a welding machine having a welding tip disposed proximate said exposed common boundary of said inserted end plug and said welding-positioned tube, and said welding machine also having a power supply; and also wherein said controlling means monitors said vacuum measuring means and said tube sensing means, and said controlling means also controls said tube transporting means, said tube rotating means, and said welding power supply, all in a preselected manner.

10. The apparatus of claim 9, wherein said tube transporting means includes driven rollers.

11. The apparatus of claim 9, wherein said tube welding position sensing means includes a continuity switch.

12. The apparatus of claim 9, wherein said tube rotating means includes a powerized rotatable chuck.

13. The apparatus of claim 9, wherein said controlling means activates said tube transporting means to transport an unwelded said tube to said welding position; then said controlling means activates said arm rotating means to rotate said housing to said first position and then activates said table moving means to move said table to said first location, activates said tube rotating means to longitudinally rotate said tube, and activates said vacuum pump to draw a vacuum, all when said tube welding position sensing means indicates said tube is in said welding position; and then said controlling means activates said welding power supply when said vacuum sensing means indicates a preselected vacuum level.

14. The apparatus of claim 13, wherein said controlling means deactivates said welding power supply, deactivates said tube rotating means, deactivates said vacuum pump, activates said table moving means to move said table to said second location, and then activates said arm rotating means to rotate said housing to said second position, all when said inserted end plug has been girth welded to said welding-positioned tube; and then said controlling means activates said tube transporting means to transport said welded tube away from said welding position when said housing is at said second position.

15. The apparatus of claim 14, wherein said controlling means includes a microprocessor.

* * * * *